(12) United States Patent
Hurst et al.

(10) Patent No.: US 9,916,372 B1
(45) Date of Patent: Mar. 13, 2018

(54) FOLDED-HASHTABLE SYNCHRONIZATION MECHANISM

(71) Applicant: Amazon Technologies, Inc., Reno, NV (US)

(72) Inventors: William Nathan John Hurst, Seattle, WA (US); Timothy Daniel Cole, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 705 days.

(21) Appl. No.: 14/268,951

(22) Filed: May 2, 2014

(51) Int. Cl.
*G06F 17/30* (2006.01)

(52) U.S. Cl.
CPC .............. *G06F 17/30575* (2013.01)

(58) Field of Classification Search
None
See application file for complete search history.

(56) References Cited

U.S. PATENT DOCUMENTS

| | | | | |
|---|---|---|---|---|
| 2012/0210095 | A1* | 8/2012 | Nellans | G06F 12/1072 711/206 |
| 2014/0143446 | A1* | 5/2014 | Jacobson | H04L 67/1095 709/248 |
| 2014/0358852 | A1* | 12/2014 | Yurchenko | G06F 17/30581 707/610 |
| 2015/0199416 | A1* | 7/2015 | Kashyap | G06F 17/30581 707/622 |

OTHER PUBLICATIONS

What is Hashing; using Modulus to partition data, http://dataidol.com/tonyrogerson/2013/11/25/what-is-hashing-using-modulus-to-partition-data/, Nov. 25, 2013.*
Eppstein et al.; "What's the Difference? Efficient Set Reconciliation without Prior Context"; SIGCOMM-11; Aug. 15-19, 2011; ACM 978-1-4503-0797-0; pp. 1-12.

* cited by examiner

*Primary Examiner* — Robert Beausoliel, Jr.
*Assistant Examiner* — Hau H Hoang
(74) *Attorney, Agent, or Firm* — Baker & Hostetler LLP

(57) ABSTRACT

Computing devices may synchronize respective copies of a repository in part by sharing status information for records stored in the repository. Status information may be conveyed by encoding record identifiers in a hashtable. A hash function may be selected to have an output range equal to or larger than a number of records in the repository. A plurality of hash function outputs may be mapped to a storage location containing a sum of identifiers and a count of identifiers included in the sum. The storage location may be transmitted to a remote computing device, which may unfold the data in the storage location to identify changed records.

20 Claims, 10 Drawing Sheets

FOLDED-HASHTABLE SYNCHRONIZATION MECHANISM

BACKGROUND

Computing systems may share information maintained in various repositories, such as file systems, databases and so forth. In some cases, two or more computing systems may each maintain a copy of a repository, which is synchronized between the various computing systems. In other cases, a computing system acting as a client may retrieve subsets of the files, documents or other records stored on a computing device that is acting as a server. In these and other cases, information may be shared between the computing devices to provide an indication of the status of records maintained in the repository or on another computing device. Computing systems may, for example, perform comparisons between the collections of documents, files or other records they each possess, in order to synchronization their respective repositories and for various other reasons.

In some cases, there may be a large number of documents, files or other records maintained in a repository. Representations of the state of the repository, including indications of records that have been modified, may therefore occupy a considerable quantity of memory. In some cases data may change frequently, resulting in considerable network bandwidth consumption as record status indications are sent between various computing systems over a network. Compact representations of record status may be difficult to construct, in part due to the large number of records that may be maintained in a repository.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

A collection of records may be maintained on one or more computing nodes that synchronize the collection over a network. Synchronizing records may involve sharing information concerning the status of records stored on a computing device. On a given computing node, a record may have been added, modified, deleted or otherwise changed. On other computing nodes, the same records or other records may have also been changed. Synchronizing the records may involve communicating the status of the records held by each computing node that changes made at one location may be propagated to other locations.

As used herein, the term "records" may refer to any of various types of information units maintained on a computing system, such as photographs, word processing documents, text files, web pages, rows in a database table and so on. A record repository may include various mechanisms for storing and retrieving records, such as a file system, database management system and so forth. A record repository may be hosted on one or more computing nodes coupled to one or more storage devices, on which the records may be stored.

A record repository, which may be referred to as a repository, may act as a component of a larger system for exchanging documents, files, database rows or other types of records. In some cases, multiple repositories may be replicated with respect to each other. For example, each of several computing nodes may maintain a copy of a repository and perform synchronization to keep the copies up-to-date with respect to each other. A repository may also be used as a store of records utilized by a remote computing node. For example, documents might be retrieved from a repository, modified and then resubmitted to a repository for storage. These and other cases may utilize a mechanism for exchanging information pertaining to the status of records stored in a repository.

Figure 1A:
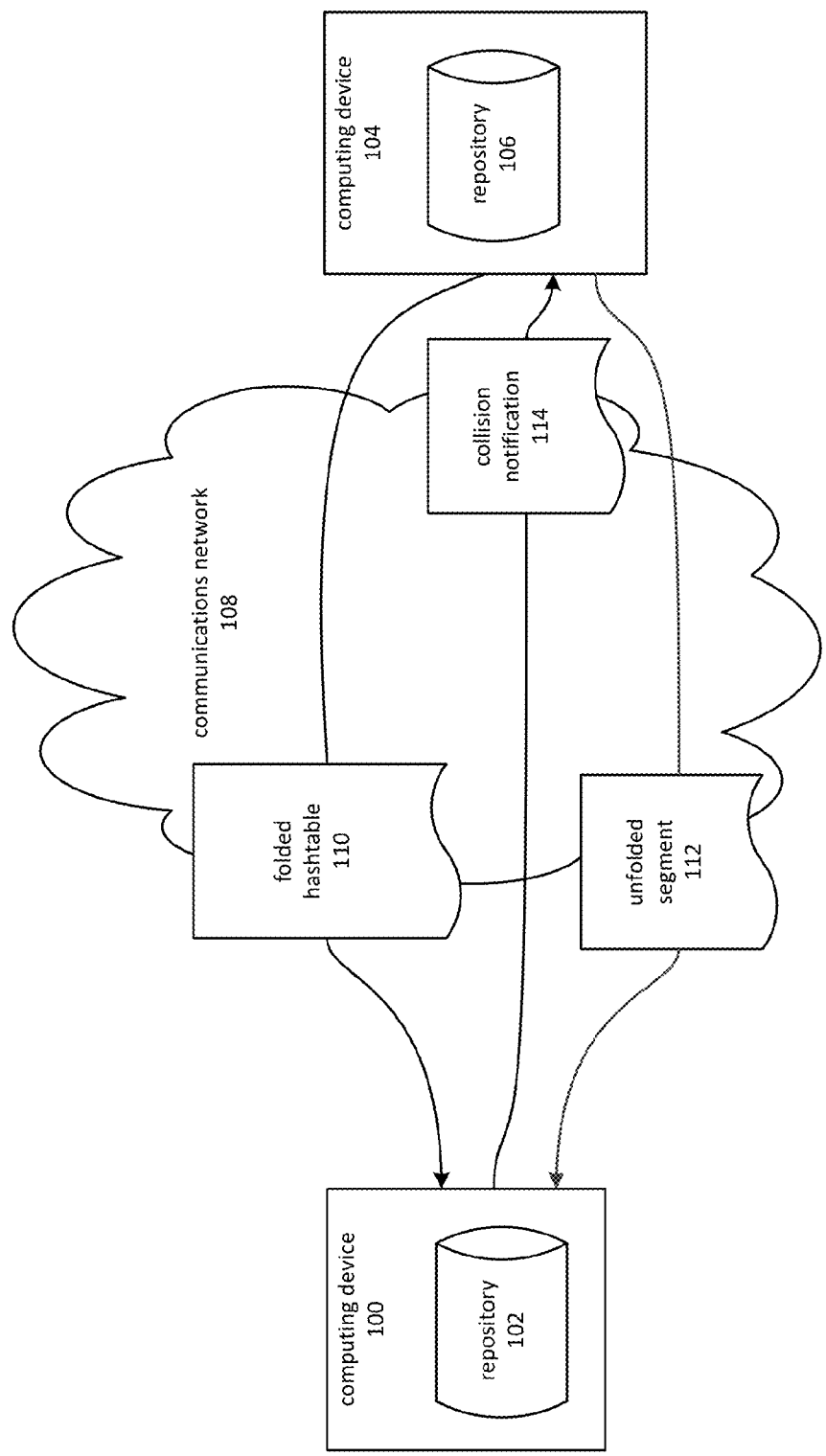
FIG. 1A is a block diagram depicting an example of a system in which record repositories are synchronized over a communications network.

FIG. 1A depicts an example of a system in which repository 102 and repository 106 are synchronized over a communications network 108. Consistent with aspects of the present disclosure, an embodiment may send folded hashtable 110 from computing device 104 to computing device 100 over communications network 108. Folded hashtable 110 may comprise hashtable buckets containing information indicative of records maintained in repository 106 that have changed and may be suitable for resynchronization. In some embodiments, an empty bucket may represent unmodified records and an occupied bucket may represent a modified record. The term bucket, as used herein, may also be referred to as a storage location. A bucket or storage location may comprise various data structures stored in a memory or other non-transitory computer-readable medium. A bucket or storage location may refer to contiguous or non-contiguous memory regions used to store information that is addressable via the output of a hash function. Folded hashtable 110 may be associated with a hash function that has an output range, sometimes referred to as a codomain, which is larger than the number of memory regions available to store information. Folded hashtable 110 may therefore fold virtual buckets—those located by an output of a hash function that exceeds the number of memory regions available for storage—into an available memory region. Each memory region, which may also be referred to as a bucket, may comprise various fields including, but not limited to, a sum of record identifiers, a count of record identifiers reflected in the sum and a checksum value.

Computing device 100 may receive folded hashtable 110 and unfold it to determine which records have changed. Unfolding folded hashtable 110 may comprise examination of each non-empty bucket. Embodiments may determine which records have been modified based at least partly on fields contained in a non-empty bucket, including a field containing a sum of record identifiers corresponding to changed records and a field containing a count of identifiers reflected in the sum field. When this count is one, the sum field may be equivalent to the record identifier of a record that has been modified. When the count is greater than one, embodiments may be able to determine the individual record identifiers that make up the sum. In some cases and embodiments, it may not be possible to determine the individual record identifiers based on sum and count fields. Embodiments may in some cases send additional information in response to a collision notification 114 sent from computing device 100 to computing device 104 via communications network 108. The term collision may be used to describe a situation in which a subset of the information needed to identify a changed document was not represented in the folded hashtable. The missing subset of information may be described as residue of the folding process. In response to collision notification 114, computing device 104 may send an unfolded segment 112 of folded hashtable 110 to computing device 100.

The collision notification 114 may comprise information indicative of a bucket for which additional information is desired. Unfolded segment 112 may comprise additional data that may be used to determine the modified records, which may include, but is not limited to, a list of record identifiers corresponding to modified records. Unfolded segment 112 may also include, but is not limited to, a partial unfolding of the bucket. For example, if a bucket in folded hashtable 110 was representative of ten modified records, unfolded segment 112 might comprise information describing two partially unfolded buckets, each representing five modified records. In general terms, unfolded segment 112 may comprise the subset of the information needed to identify a changed document, the subset being absent from folded hashtable 110 and being residue of the folding process.

Figure 1B:
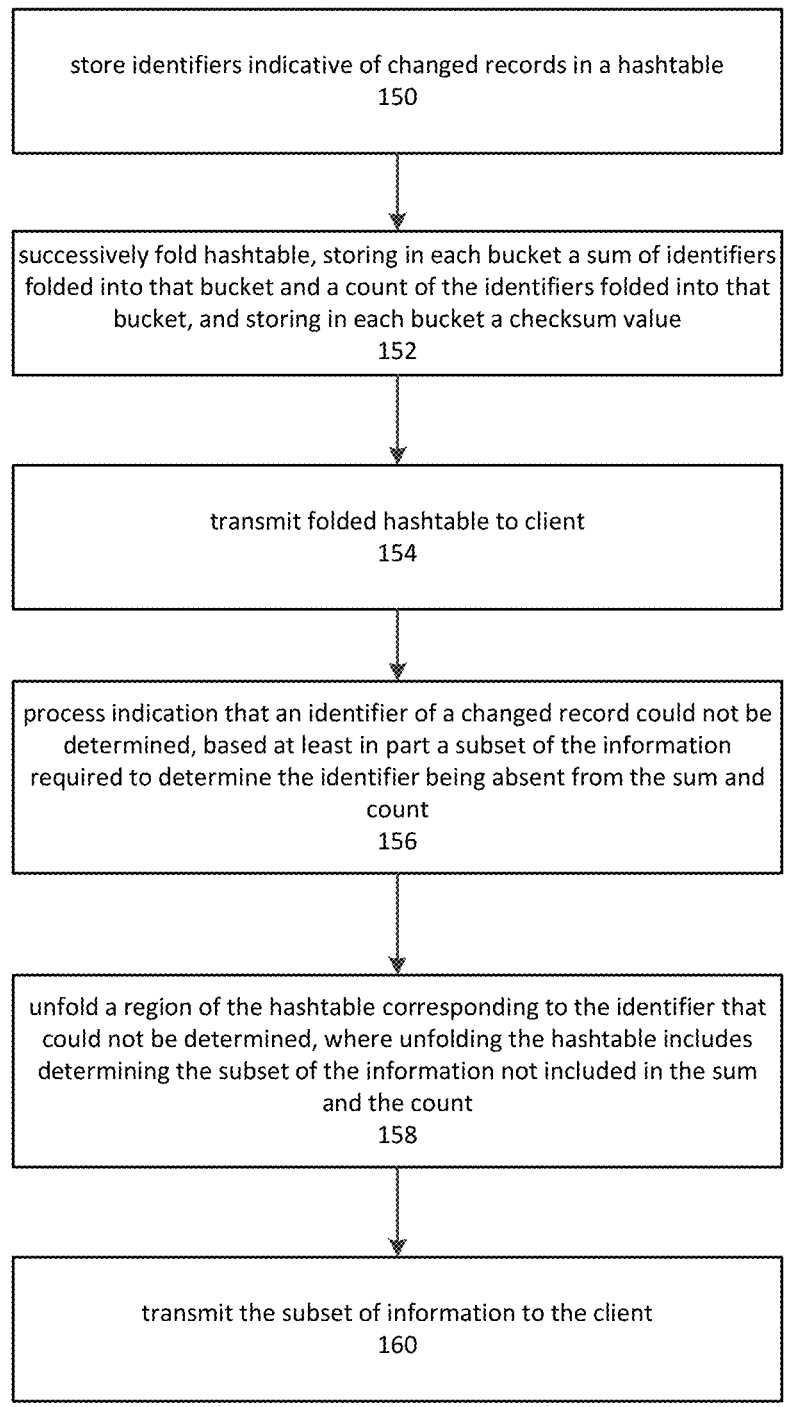
FIG. 1B is a flowchart depicting an example of synchronizing record repositories over a communications network.

FIG. 1B depicts an example of synchronizing record repositories over a communications network. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 150 depicts storing record identifiers in a hashtable in order to signify that the corresponding records have been altered. Operation 152 depicts successively folding the hashtable in order to achieve a desired degree of compression. Folding the hashtable may involve storing in each bucket of the hashtable a sum of the identifiers that are being folded into that bucket, and a count of the identifiers included in the sum. The number of identifiers included in each bucket may be based at least partly on the degree of compression desired for the hashtable. The degree of compression may be used to determine the number of times that a hashtable may be folded, which may in turn influence the likelihood that a particular bucket will be used. Embodiments may also store, in each bucket, a checksum value or other information that is indicative of residue of the folding operation. The checksum may, for example, comprise a sum of hash values computed by applying a cryptographic hash function to the record identifiers folded into the particular bucket.

At operation 154, embodiments may transmit the folded hashtable to a client. Operation 156 depicts processing an indication that an identifier of a changed document could not be determined. In some cases, it may not be possible to determine an identifier corresponding to a changed document based on the sum and the count alone. Embodiments may therefore identify the residue of the folding process, i.e. retrieve through various means the information that was lost during the process of unfolding. This may be described as an unfolding process, depicted by operation 158. Embodiments may unfold a region of the hashtable that includes the document that could not be identified. The region may in some instances comprise only a single bucket, which may be unfolded into two buckets or more buckets. Embodiments may in some cases unfold only to the extent determined or estimated to be necessary to identify the document that could not be identified with the original folded hashtable.

As depicted by operation 160, embodiments may, having at least partially unfolded a region of the folded hashtable, transmit that information to the client. The embodiment may then attempt to determine the document identifier. In some cases and embodiments, the document identifier may still not be determined based on information transmitted, due to residue of the folding process that has not yet been transmitted. In such cases additional unfolding and transmission may be performed to transmit the remainder of the missing subset of information.

Figure 2:
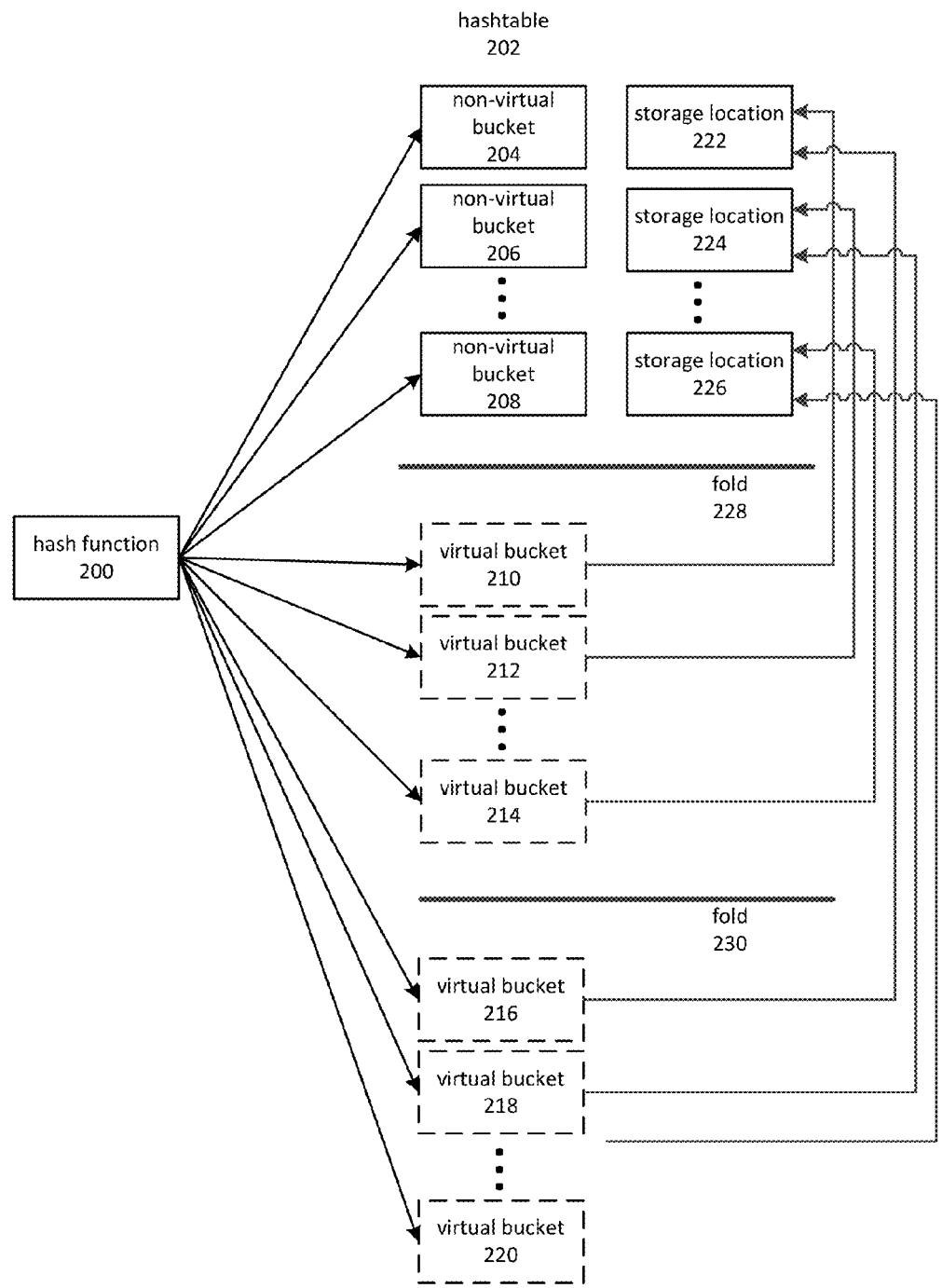
FIG. 2 is a block diagram depicting an example of an embodiment of a folded hashtable storing information indicative of records that have been modified and which embodiments may determine to synchronize.

FIG. 2 depicts an example of an embodiment of a folded hashtable storing information pertaining to records that have been modified and which embodiments may determine to synchronize with a remote computing device. A hash function 200 may comprise computer-executable code and/or circuitry for mapping from an input, such as a record identifier, to an output within a defined range. For example, the output range of hash function 200 may be integral values from one to N and may be used as indices into an array or other data storage structure.

Hashtable 202 may comprise a number of storage locations, such as storage locations 222, 224 and 226, that is less than the output range of hash function 200. For example, if hash function 200 produces integer outputs in the range of one to N, an embodiment may have a number of storage locations equal to M, where M<N. Such an embodiment may be described as having M non-virtual buckets, such as non-virtual buckets 204, 206 and 208. Such an embodiment could also be described as having N minus M virtual buckets, including virtual buckets 210-220.

Output of hash function 200 may directly map to one of non-virtual buckets 204-208 when less than or equal to M. When larger than M, output may be mapped to a virtual bucket that has been folded onto a storage location corresponding to a non-virtual bucket. For example, embodiments may map a hash output of M+1 to virtual bucket 210, M+2 to virtual bucket 212 and N to virtual bucket 220.

Hashtable 202 may be described as having been folded along fold 228 and fold 230. Embodiments may fold hashtables on partitions, such as the depicted folds 228 and 230, determined by various means. FIG. 2 depicts a three-way folding, but other cases or embodiments may perform N-way folding. In some embodiments, folding may comprise bisecting a hashtable so that half of the previous number of storage locations are utilized. Embodiments may perform successive bisecting to further compress the hashtable.

Figure 3A:
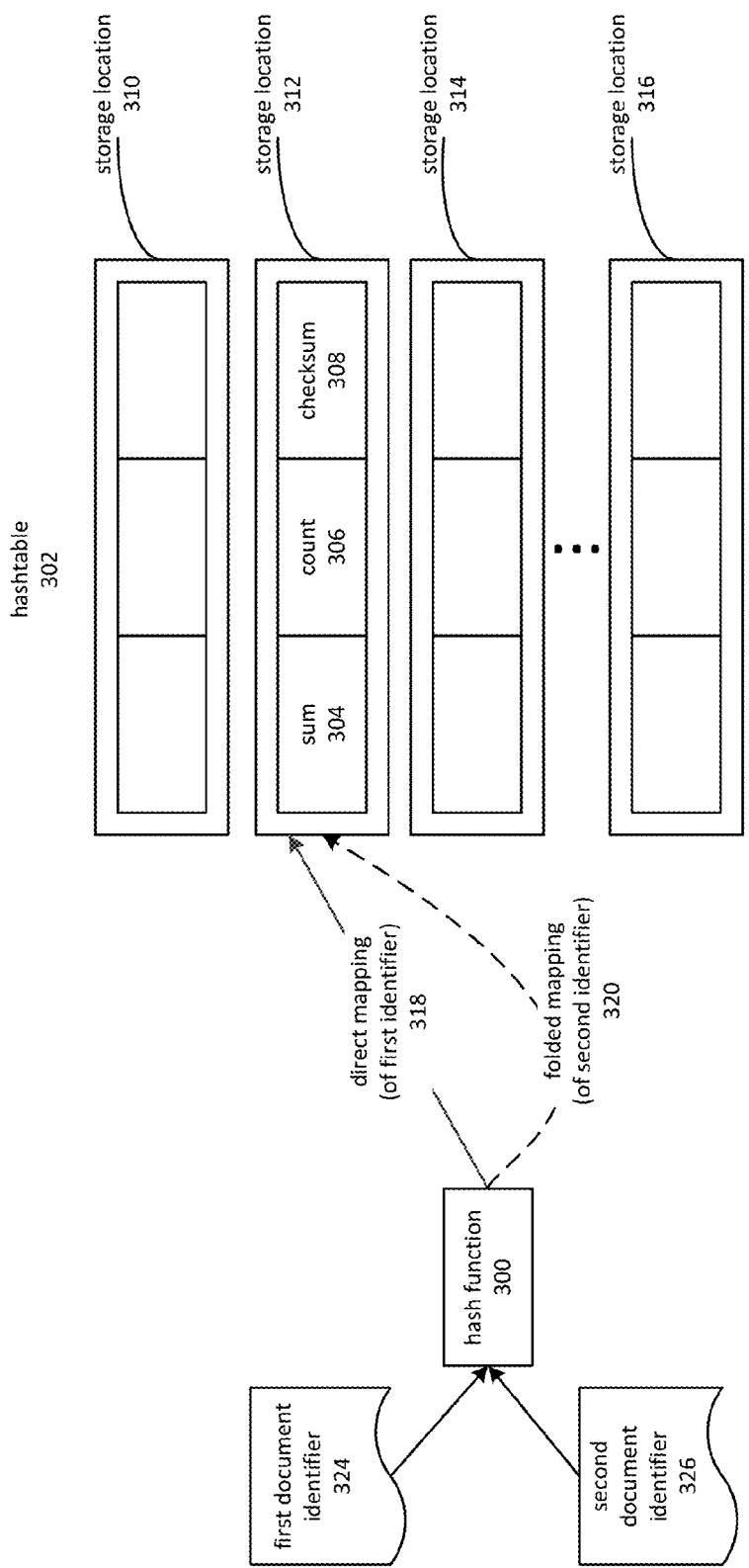
FIG. 3A is a block diagram depicting folding of virtual hashtable buckets onto a single storage location.

FIG. 3A is a block diagram depicting folding of virtual hashtable buckets onto a single storage location. A hashtable 302 may comprise some number of storage locations 310-316. A hash function 300 may, in response to input from a first record identifier 324, produce output that may comprise a direct mapping 318 to a storage location 312. Input of a second record identifier 326 to hash function 300 may produce output comprising a folded mapping 320 to the same storage location 312.

Hash function 300 may comprise a cryptographic hash function. Cryptographic hash functions may be employed by various embodiments based on properties such as having a relatively low probability of producing collisions. One non-limiting example of a cryptographic hash function that may be employed by various embodiments is message-digest 5 ("MD5"). Another non-limiting example includes secure hash algorithm 1 ("SHA-1") and variants thereof.

Folding of output may be performed in various ways, including but not limited to those based on dividing the maximum output of the hash function by the number of available storage locations.

Embodiments may store information in storage location 312 in to represent first record identifier 324 and second record identifier 326. Embodiments may store information indicative of a sum 304 of first record identifier 324 and second record identifier 326. Embodiments may also store information indicative of a count 306 of the number of identifiers included in sum 304. For example, if sum 304 contains the result of adding first record identifier 324 with second record identifier 326, then embodiments could store a value of two in count 306. Some embodiments may also store a checksum 308. Various techniques may be employed for calculating checksum 308, including summation of the output of applying a hash function, such as hash function 300, to identifiers reflected in sum 304 and count 306. A checksum may be used by some embodiments in conjunction with negative identifiers.

Figure 3B:
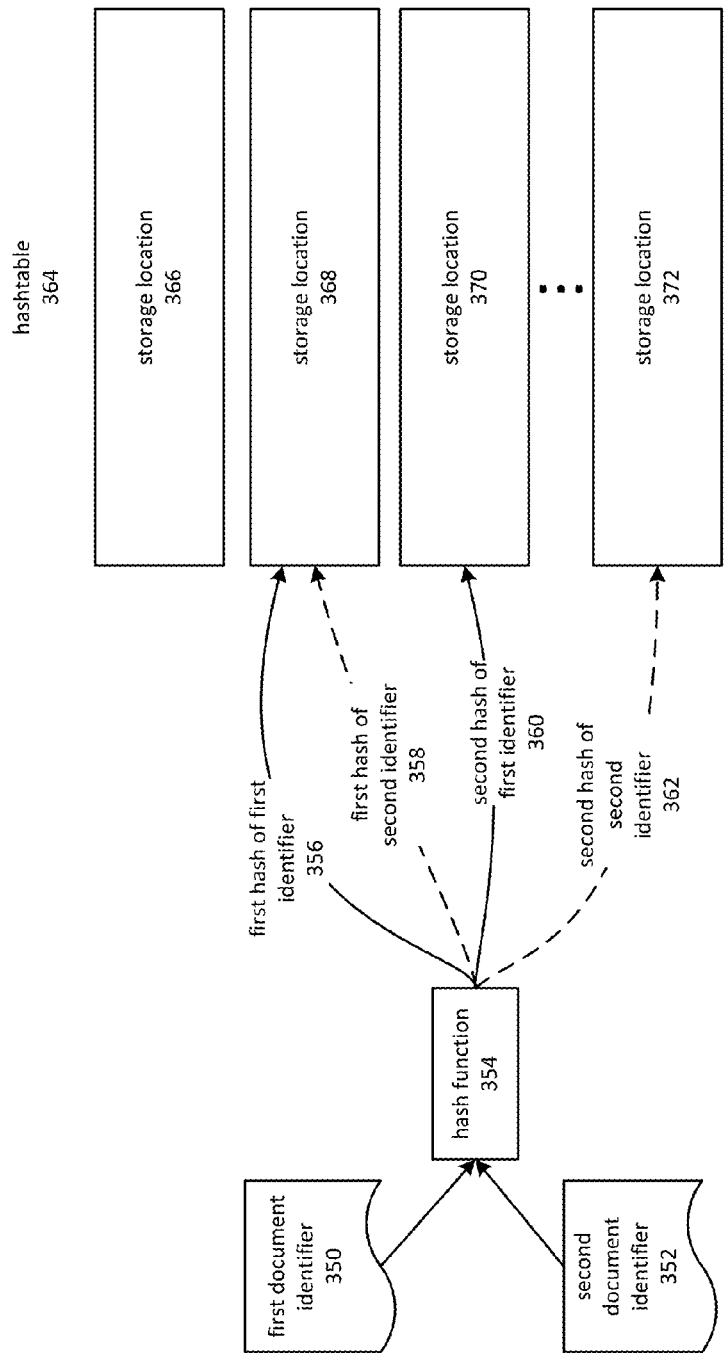
FIG. 3B is a block diagram depicting an embodiment of reconstructing folded hashtable buckets using a multi-output hash function.

FIG. 3B is a block diagram depicting an embodiment of reconstructing folded hashtable buckets using a multi-output hash function. A hash function 354 corresponding to hashtable 364 may map storage locations 366 to 372. The output range of hash function 354 may exceed the range of storage locations 366-372. Embodiments may map output exceeding the range of storage locations 366-372 in a manner such as is depicted by FIG. 3A.

Hash function 354 may be a multi-output hash function. For example, it may comprise a plurality of single-output hash functions. A single input to hash function 353 may return a plurality of output values within the output range. The values returned may be constant for a given input. As depicted by the example of FIG. 3B, in response to an input of first record identifier 350, hash function 354 may return both a first hash of the first identifier 356 and a second hash of the first identifier 360. In response to an input of second identifier 352, hash function 354 may return both a first hash of second identifier 358 and a second hash of second identifier 362. Based on these outputs, information indicative of the first record identifer 350 may be stored at both of storage locations 368 and 370. Information indicative of the second record identifier 352 may be stored at both of storage locations 368 and 372. As depicted in FIG. 3B, storage location 368 stores information indicative of both the first and second record identifiers 350 and 352, respectively. This may, for example, consist of a sum including first record identifier 350 and second record identifier 352, and a count indicative of the number of identifiers included in the sum.

It may be the case that information pertaining to a single record may not be retrieved based only on the data kept in storage location 368. In such cases, embodiments may consult other storage locations to retrieve the information. For example, if information indicative of the first record identifier 350 cannot be retrieved from storage location 368, it may instead be retrieved from storage location 370. Similarly, information indicative of the second record identifier 352 could be retrieved from either storage location 368 or storage location 372. Accordingly, embodiments may utilize a hash function producing multiple outputs for an input to store information indicative of modified records in a plurality of locations. The embodiments may then utilize one or more of the plurality of locations to retrieve information indicative of modified records. When an embodiment cannot extract a record identifier from a particular storage location, embodiments may retrieve the information from an additional storage location, as indicated by the additional outputs of the hash function for a corresponding input.

Figure 4:
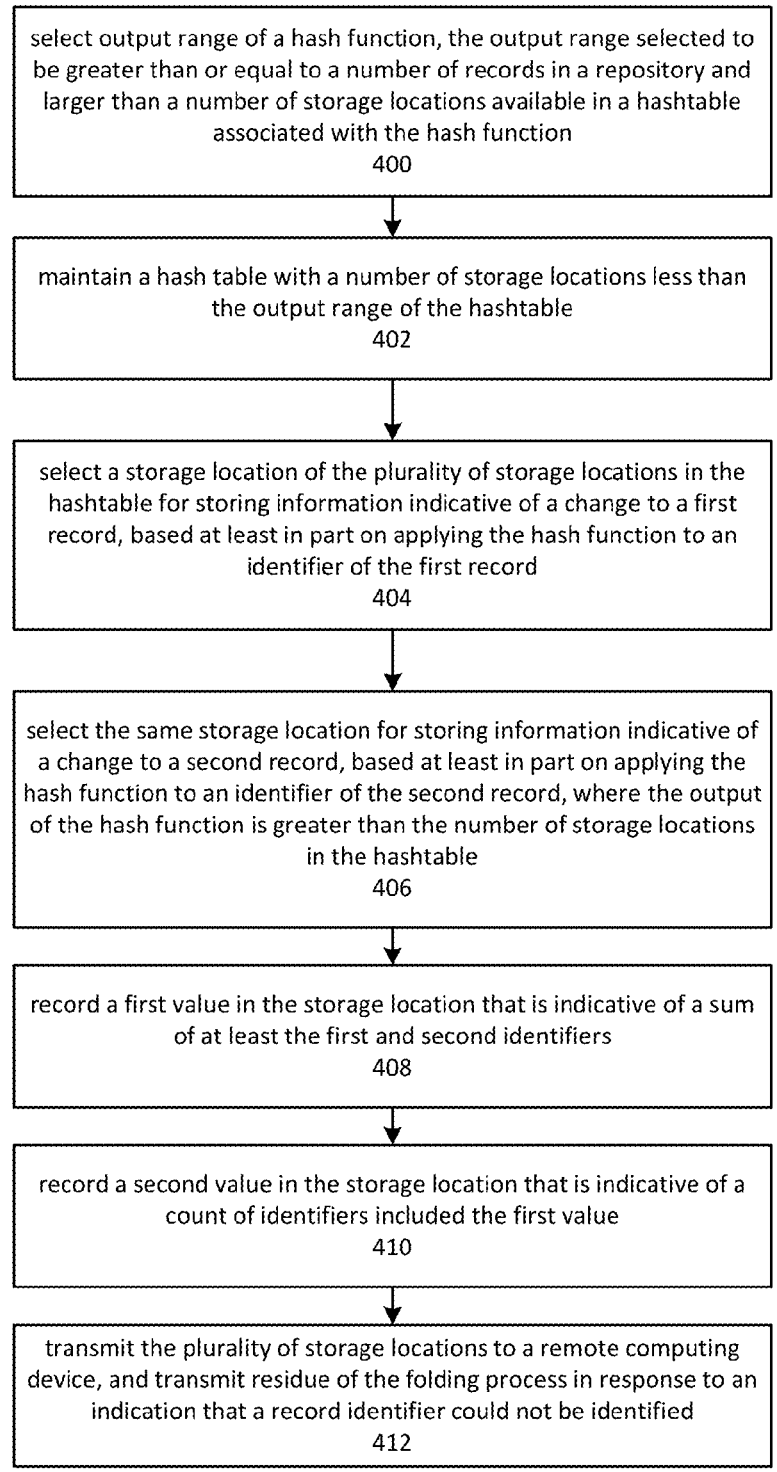
FIG. 4 is a flowchart depicting an embodiment of a process for storing and transmitting information indicative of modified records to a remote computing device.

FIG. 4 depicts an embodiment of a process for storing and transmitting information indicative of modified records to a remote computing device. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 400 depicts selecting an output range of a hash function. The output range of the hash function may be selected to be greater than or equal to the number of records stored or expected to be stored in a repository. The output range of the hash function may also be selected to be larger than the number of storage locations available in a hashtable associated with the hash function. For example, an embodiment might select an output range for a hash function to be the square of the number of records expected to be stored in a repository. Embodiments may utilize the large output range of the hash function even though it might be impractical, in some cases, to allocate storage locations on a one-to-one basis with outputs of the hash function. Embodiments may instead utilize techniques such as hashtable folding, as disclosed herein, to utilize a large hashtable output range with a smaller number of available storage locations. A large output range for a hash function may be utilized, by some embodiments, in conjunction with hash functions that produce multiple outputs in response to a single input. In such cases, a large range for a hash function may reduce the chance that a record identifier, stored in multiple locations corresponding to multiple outputs of the hash, cannot be identified even when a collision with another record identifier has occurred.

Operation 402 depicts maintaining a hashtable with a number of storage locations that is less than the output range of the hash function. A storage location in a hashtable may be defined as a data structure, including contiguous or non-contiguous memory regions for storing information, for which the storage location is addressable by the output of a hash function. In various embodiments, the number of storage locations may be significantly smaller than the output range of the hash function. Embodiments may utilize a high degree of folding, so that each storage location may correspond to a high number of hash function output values. Some embodiments may employ two hashtable structures. In the first hashtable, storage locations might be addressable on a one-to-one basis with output of the hash function. A first hashtable might employ sparse representational techniques in order to avoid allocating memory for each potentially usable storage location. A second hashtable might be a folded representation of the first.

Operation 404 depicts selecting a bucket from the plurality of buckets in the hashtable for storing information indicative of a change to a first record. This may be based at least in part on applying a hash function to an identifier that corresponds to the first record and using the output as an index into the hashtable. The output of the hash function may directly map to the selected storage location, or it may be folded onto the storage location.

Operation 406 depicts selecting the same bucket in the hashtable for storing information indicative of a change to a second record, based at least in part on applying the hash function to an identifier that corresponds to the second record. With respect to the identifier of the second record, the output of the hash function may be greater than the number of buckets in the hashtable, but map to the same bucket as the output of the hash function applied to the first identifier. This operation may be repeated so that additional record identifiers may be selected for storing in the same bucket.

Embodiments may, as depicted by operation 408, record a first value in the bucket that is indicative of a sum of at least the first and second identifiers. Embodiments may employ identifiers with characteristics that ensure or improve the likelihood that identifiers may be unfolded based on the sum. For example, embodiments may utilize monotonically increasing positive values. However, some embodiments may utilize record identifiers that do not possess these characteristics. As used herein, the term "sum" may include various operations that are additive in nature, including mathematical addition, exclusive-or operations and so forth.

Operation 410 depicts recording a second value in the same bucket. The second value may be indicative of a count of the number of identifiers included in the sum recorded in the first value. The term included may refer to utilizing the value in calculating the sum. For example, if the first and second record identifiers are the only identifiers used to calculate the sum, the second value representing a count field may be set to two.

At operation 412, embodiments may transmit the hashtable buckets to a remote computing device. Some embodiments may send the complete hashtable. Embodiments may perform iterative folding of a larger hashtable. Iterative folding may be repeated a number of times based on factors such as a target size, a number of potential unrecoverable collisions and so forth. The number of potential unrecoverable collisions may be based on the count values maintained in each storage location. For example, when two buckets are folded, the two sum values from the original two storage locations are combined, as are the two count values. The possibility of an unrecoverable collision may, in some embodiments, increase with the number of values included in the sum. Embodiments may therefore, for example, repeatedly fold a hashtable until the average value of the "count" fields is above a threshold value.

In some cases and embodiments, the process of folding record identifiers into a single storage location may result in residue, or in other words a subset of the information needed to identify the record identifiers being left out of the folded hashtable. Operation 412 also depicts transmitting information indicative of the residue in response to receiving an indication that a record identifier in the folded hashtable could not be identified. Information not represented by the sum and count may be transmitted to the client in response to receiving an indication that a record identifier could not be determined. In some cases and embodiments, this may comprise a full or a partial unfolding of a region of the hashtable that includes the record identifier that could not be identified.

Figure 5:
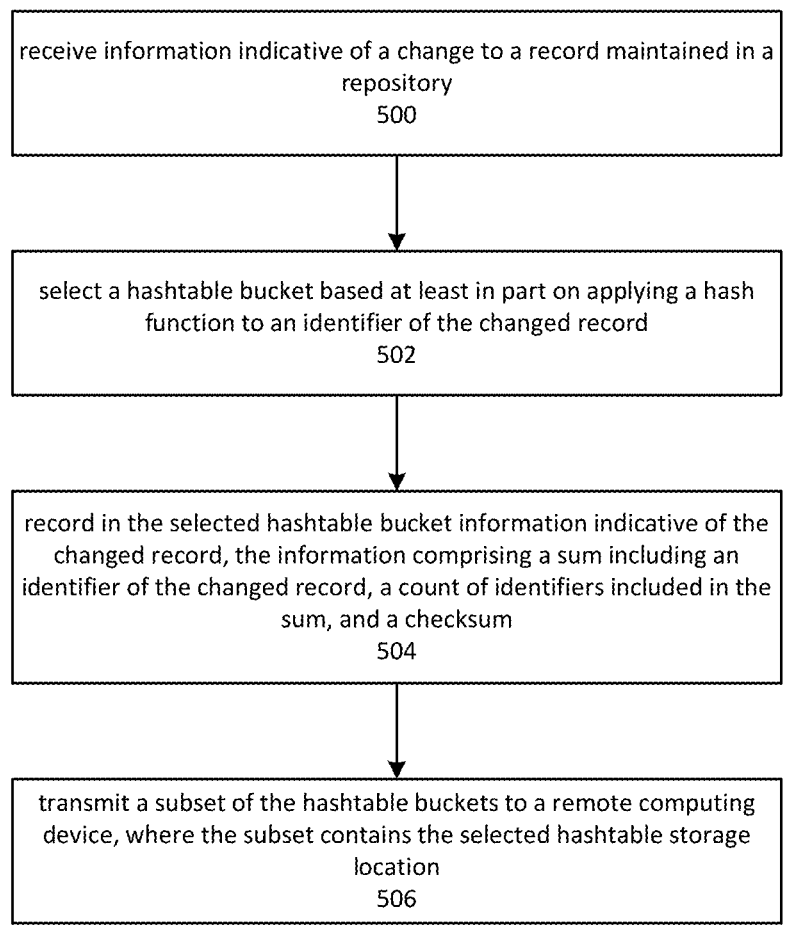
FIG. 5 is a flowchart depicting an embodiment of a process for identifying changed records by transmitting a subset of a folded hashtable.

In some cases and embodiments, a subset of the hashtable may be transmitted to a remote computing device in order to identify records that have changed. FIG. 5 depicts an embodiment of a process for identifying changed records by transmitting a subset of a folded hashtable. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 500 depicts receiving information indicative of a change to a record maintained in a record repository. This may include modifications to existing records, deletions of existing records, and addition of new records. The information may be received by a process or module associated with or communicatively coupled to a record repository.

Operation 502 depicts selecting a hashtable bucket based at least in part on applying a hash function to an identifier of the changed record. The output of the hash function may be folded in the event that the output is greater than the number of buckets in the hashtable. Operation 504 depicts recording, in the selected bucket, information indicative of the changed record. The information may comprise a sum that includes the record identifier for the changed record, and an updated count value indicating the number of identifiers reflected in the sum. The information stored may also include a checksum, which may for example comprise a sum of the hashes of the record identifiers. The hash function may be a cryptographic hash function, and may be different from the hash function used to select buckets. The checksum may be used to store residue that might otherwise be lost, and may be used subsequently to determine what additional information may be used to identify a changed record that was not identifiable based on only on the sum and count.

At operation 506, a subset of the plurality of buckets in the hashtable may be transmitted to a remote computing device. The subset may include the bucket that corresponds to the changed record, and may include fewer buckets than are present in the hashtable. Embodiments may transmit only those buckets containing changes or those buckets that have changed since the last complete transmission of the buckets in the hashtable. Various techniques involving timestamps or message serial numbers may be employed to identify the order in which changes were made.

Figure 6:
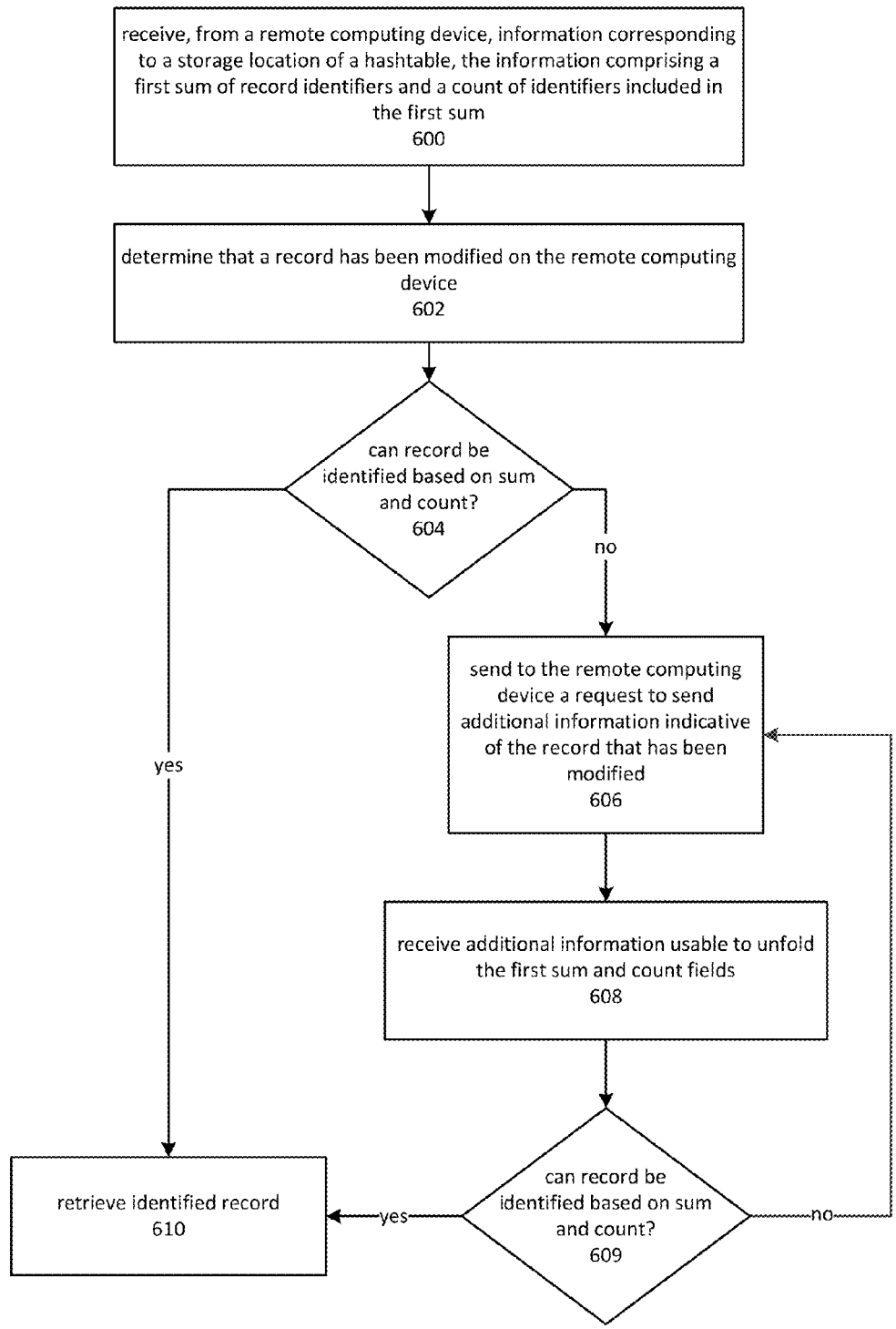
FIG. 6 is a flowchart depicting an embodiment of a process for receiving hashtable bucket information and unfolding the hashtable bucket information to identify modified records.

FIG. 6 depicts an embodiment of a process for receiving hashtable bucket information and unfolding the hashtable bucket information to identify modified records. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 600 depicts receiving, from a remote computing device, information corresponding to a bucket of a hashtable. The information may comprise a sum of record identifiers and a count of the identifiers included in the sum.

At operation 602, embodiments may determine that one or more records have been modified by examination of the received hashtable bucket. Typically, receipt of a hashtable bucket may indicate that at least one record has changed on the remote computing device. Operation 604 depicts determining whether or not the record can be identified based upon the sum, count and other available information, such as a checksum value. This may comprise attempting to determine record identifiers that were added to form the sum. For example, if a bucket contained a sum of 4 and a count of 2, the record identifiers used to produce the sum could, for some embodiments, be (0, 4), (1, 3) and (2, 2). Some embodiments may utilize a checksum field to determine which permutation is correct. In some embodiments, record identifiers may be selected to reduce or eliminate situations in which summed values in the record identifier may not be individuated. Some embodiments may employ functions in addition to summation, for example by adding the squares of record identifiers.

If a record identifier is obtained based on the sum and count fields, it may be retrieved as depicted by operation 610. Retrieving the record may comprise sending a request to the remote computing device to send the record. In some embodiments, the request may comprise information indicative of sending all or some of the record, such as a differential between the version currently known to the local computing device and a last known version. Embodiments may utilize record identifiers that are indicative of record versions, for example by reserving digits of a record identifier to identify a specific version of a record.

In some cases and embodiments, record identifiers may not be individuated based on a sum and count, or based on a sum, count and checksum if the latter field is used. In such cases, embodiments may send the remote computing device a request to send additional information, as depicted by operation 606. The request may be for the remote computing device to send additional information that may directly or indirectly identify the records reflected in the sum and count fields of the hashtable bucket.

At operation 608, the local computing device may receive the information from the remote computing device. The information may be used to wholly or partially unfold the hashtable bucket. Some embodiments may send a partial or complete list of record identifiers included in the first sum and count fields. The number of record identifiers transmitted may be selected based on minimizing the size of the transmission while still allowing for individuation of the record identifiers. The identifiers included in the list may also be selected based on the included identifiers, allowing the identifiers to be extracted from the sum and count fields. Some embodiments may, instead of or in addition to a list of record identifiers, send a second sum and second count that is indicative of a subset of the identifiers reflected by the sum and count fields of the hashtable bucket. These may also be selected, by various embodiments, based on their utility in extracting the individual record identifiers.

At operation 609, embodiments may determine, based on the additional information received, that the record may be identified. If so, the record may be retrieved as depicted by operation 610. In some cases, the additional information may be used to perform a partial unfolding of the sum and count fields into two sets of sum and count fields. Some document identifiers may be determined using this data after the unfolding, but other document identifiers may not be determined. If so, a request for additional information may again be sent, so that further unfolding can occur. This is depicted in FIG. 6 by a path from operation 609 to operation 606.

Operation 610 depicts retrieving the identified record. Embodiments may transmit a request to the remote computing device to send information indicative of the modified record. The request may include a record identifier extracted from the sum and count fields. The information sent by the remote computing device may comprise, for example, a copy of the record or one or more deltas between an old version of the record and a current version stored on the remote computing device.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 7:
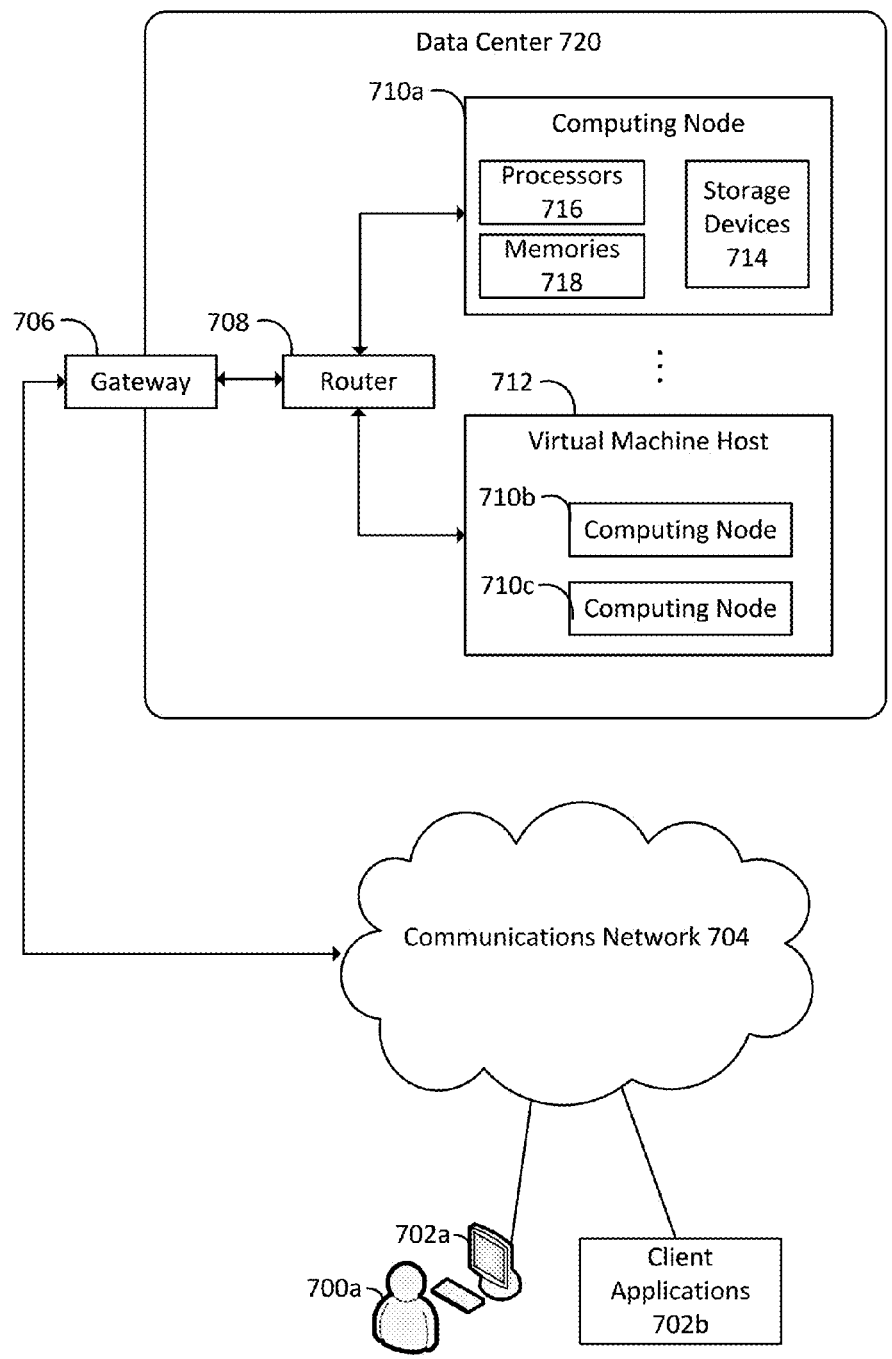
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b and 710c within a data center 720. Alternatively, client applications 702b may communicate without user intervention. Communications network 704 may comprise any combination of communications technology, including the Internet, wired and wireless local area networks, fiber optic networks, satellite communications and so forth. Any number of networking protocols may be employed.

Communication with processes executing on the computing nodes 710a, 710b and 710c, operating within data center 720, may be provided via gateway 706 and router 708. Numerous other network configurations may also be employed. Although not explicitly depicted in FIG. 7, various authentication mechanisms, web service layers, business objects or other intermediate layers may be provided to mediate communication with the processes executing on computing nodes 710a, 710b and 710c. Some of these intermediate layers may themselves comprise processes executing on one or more of the computing nodes. Computing nodes 710a, 710b and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718 and one or more storage devices 714. Processes on computing node 710a may execute in conjunction with an operating system or alternatively may execute as a bare-metal process that directly interacts with physical resources, such as processors 716, memories 718 or storage devices 714.

Computing nodes 710*b* and 710*c* are depicted as operating on virtual machine host 712, which may provide shared access to various physical resources, such as physical processors, memory and storage devices. Any number of virtualization mechanisms might be employed to host the computing nodes.

The various computing nodes depicted in FIG. 7 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
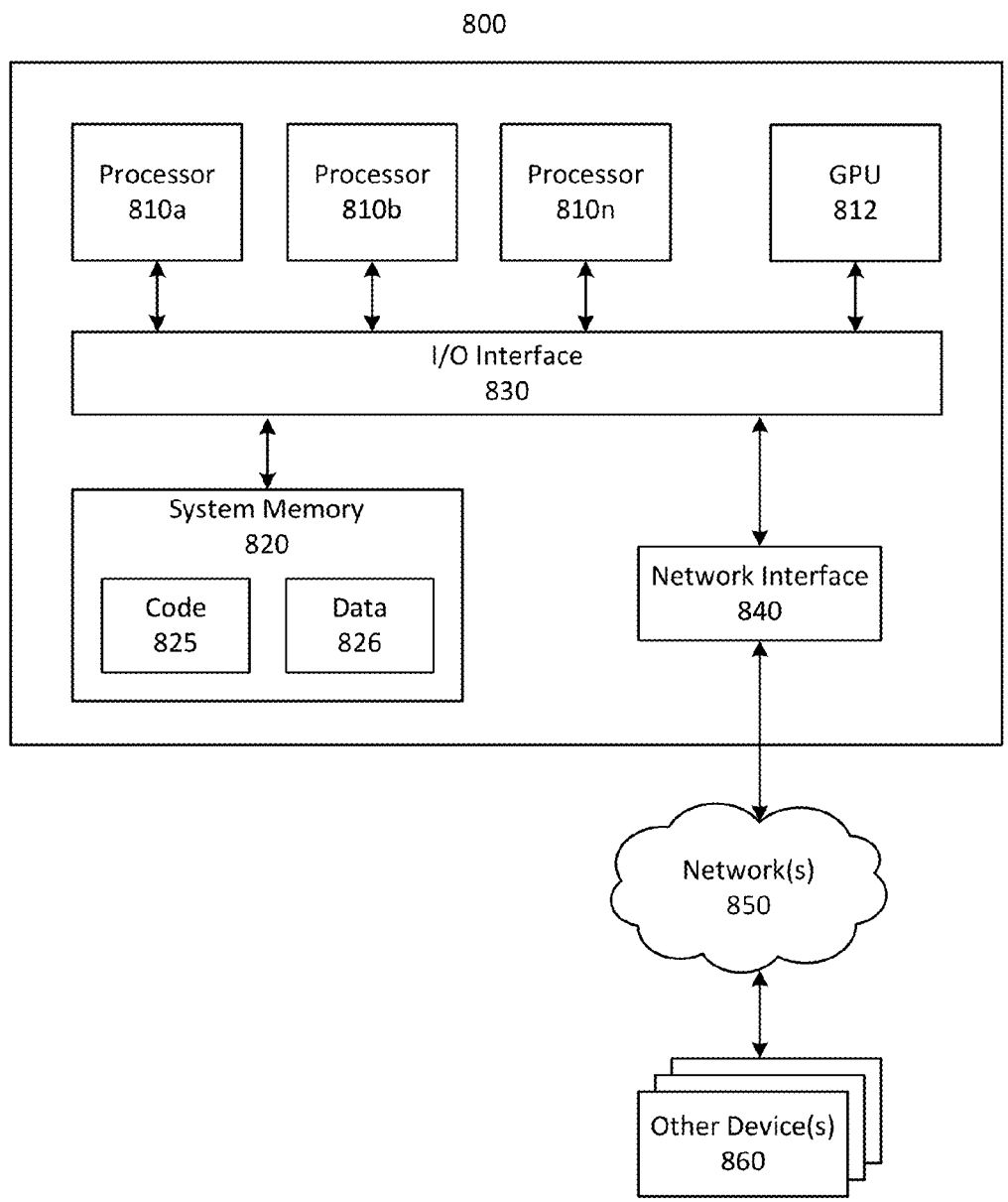
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810*a*, 810*b* and/or 810*n* (which may be referred herein singularly as a processor 810 or in the plural as the processors 810) coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more storage devices having stored thereon a plurality of records;
one or more computing devices; and
one or more memories having stored thereon computer readable instructions that, upon execution by the one or more computing devices, cause the system at least to:
select an output range of a hash function, the output range selected to be greater than or equal to a number of records of a plurality of records stored in a repository, the output range further selected to be larger than a number of storage locations in a plurality of storage locations associated with a hashtable;
select a first storage location of the plurality of storage locations, the first storage location selected for storing information indicative of a change to a first record, the first storage location selected based at least in part on a first hash value formed by applying the hash function to a first identifier of the first record;
select the first storage location for storing, in addition to the information indicative of the change to the first record, information indicative of changes to one or more additional records, the first storage location selected based at least in part on application of the hash function to identifiers of the one or more additional records and a mapping of output of the hash function onto the first storage location;
store, in the first storage location, a first sum including at least the first identifier and the identifiers of the one or more additional records;
store, in the first storage location, a first count of identifiers included in the first sum;
transmit data indicative of the first sum and the first count in the first storage location to a remote computing device;
determine to unfold the first storage location into a plurality of storage locations, based at least in part on receiving an indication that the first sum and the first count were not sufficient to determine the first identifier, wherein unfolding the first storage location comprises determining a subset of information indicative of the first identifier that was not represented by the first sum and the first count; and
transmit at least the subset of information to the remote computing device.

2. The system of claim 1, further comprising one or more memories having stored thereon computer readable instructions that, upon execution by the one or more computing devices, cause the system at least to:

select a second storage location of the plurality of storage locations for combining with the first storage location, wherein the second storage location comprises information indicative of a third record; and include an identifier of the third record in the first sum stored in the first storage location and incrementing the first count.

3. The system of claim 1, further comprising one or more memories having stored thereon computer readable instructions that, upon execution by the one or more computing devices, cause the system at least to:

store information indicative of a change to an additional record in an additional storage location of the plurality of storage locations; and transmit data indicative of a subset of the plurality of storage locations to the remote computing device, wherein the subset of the plurality includes the additional storage location and contains fewer storage locations than the plurality of storage locations.

4. The system of claim 1, further comprising one or more memories having stored thereon computer readable instructions that, upon execution by the one or more computing devices, cause the system at least to:

receive, from the remote computing device, data corresponding to the first storage location, the data comprising a second sum including at least the first identifier, the identifiers of the one or more additional records, and a third identifier; and determine that a third record corresponding to the third identifier has been modified, based at least in part on the second sum.

5. A computer-implemented method comprising:

selecting a first storage location of a plurality of storage locations associated with a hashtable, the first storage location selected for storing information indicative of a first record of a plurality of records, the first storage location selected based at least in part on a first hash value formed by applying a hash function to a first identifier of the first record, the hash function having an output range greater than a number of storage locations in the plurality of storage locations and having an output range greater than or equal to a number of records in the plurality of records;

selecting the first storage location for storing information indicative of a second record, the first storage location selected for storing the second record based at least in part on a second hash value formed by applying a second identifier of the second record to the hash function;

storing the information indicative of the first record and the information indicative of the second record by at least storing, in the first storage location, a first sum indicative of the first identifier and the second identifier and a first count indicative of a number of identifiers included in the first sum;

transmitting the first sum and the first count from the first storage location to a remote computing device; and transmitting, in response to an indication that the first sum and the first count were not sufficient to determine the first identifier, additional information indicative of the first identifier, the information determined based at least in part on determining a subset of information indicative of the first identifier that was not represented by the first sum and the first count.

6. The computer-implemented method of claim 5, further comprising:

selecting, in response to determining to form a compressed version of the plurality of storage locations, a second storage location of the plurality of storage locations for combining with the first storage location, wherein the second storage location comprises information indicative of a third record; and including an identifier of the third record in the first sum stored in the first storage location and incrementing the first count stored in the first storage location.

7. The computer-implemented method of claim 5, further comprising:

storing in an additional storage location information indicative of a change to an additional record, the information comprising a second sum including an identifier of the additional record and a second count of identifiers included in the sum; and transmitting a subset of the plurality of storage locations to the remote computing device, wherein the subset of the plurality includes the additional storage location and contains fewer storage locations than the plurality of storage locations.

8. The computer-implemented method of claim 5, further comprising:

storing, in the first storage location, a value formed based at least in part on applying a checksum function to the first identifier and applying the checksum function to the second identifier.

9. The computer-implemented method of claim 5, wherein applying the hash function to the first identifier of the first record produces at least the first hash value and one or more additional hash values, the method further comprising:

selecting a second storage location, in addition to the first storage location, for storing the information indicative of the first record, the selecting based at least in part on one of the one or more additional hash values.

10. The computer-implemented method of claim 5, further comprising:

receiving, from the remote computing device, information corresponding to the first storage location, the information comprising a second sum including an additional identifier of a modified record, and a second count indicative of a number of identifiers included in the second sum; and determining the identifier of the modified record based at least in part on the second sum and the second count indicative of the number of identifiers.

11. The computer-implemented method of claim 10, further comprising:

send to the remote computing device a request to transmit the modified record.

12. The computer-implemented method of claim 5, further comprising:

storing, in the first storage location, a checksum value computed based at least in part on a sum of cryptographic hash values of document identifiers, wherein the cryptographic hash values are computed with a cryptographic hash function that is different than the hash function; and determining the subset of information indicative of the first identifier that was not represented by the first value and the second value, based at least in part on the checksum value.

13. A non-transitory computer-readable storage medium having stored thereon instructions that, upon execution by one or more computing devices, cause the one or more computing devices at least to:

configure an output range of a hash function, the output range selected to be greater than or equal to a number of records of a plurality of records stored in a repository, the output range further selected to be larger than a number of storage locations in a plurality of storage locations associated with a hashtable;

select a first storage location of the plurality of storage locations, the first storage location selected for storing information indicative of a change to a first record, the first storage location selected based at least in part on a first hash value formed by applying the hash function to a first identifier of the first record;

select the first storage location for storing information indicative of a change to a second record, the first storage location selected based at least in part on a second hash value formed by applying the hash function to a second identifier of the second record, the second hash value corresponding to at least one of a virtual storage location or one or more of the plurality of storage locations;

store a first value in the first storage location, the first value based at least in part on a plurality of identifiers including the first identifier and the second identifier;

store, in the first storage location, a second value based at least in part on a number of identifiers in the plurality of identifiers; and transmit, in response to an indication that the first value and the second value were not sufficient to determine the first identifier, additional information indicative of unfolding the first storage location into a plurality of storage locations, wherein the additional information is determined based at least in part on determining a subset of information indicative of the first identifier that was not represented by the first value and the second value.

14. The non-transitory computer-readable storage medium of claim 13, comprising further instructions that, upon execution by the one or more computing devices, cause the one or more computing devices to at least:

update the first value to include a number of additional document identifiers, wherein a count of the additional document identifiers is determined based at least in part on a degree of compression.

15. The non-transitory computer-readable storage medium of claim 13, comprising further instructions that, upon execution by the one or more computing devices, cause the one or more computing devices to at least:

store in an additional storage location information indicative of a change to an additional record; and transmit a subset of the plurality of storage locations to a remote computing device, wherein the subset of the plurality includes the additional storage location and contains fewer storage locations than the plurality of storage locations.

16. The non-transitory computer-readable storage medium of claim 13, comprising further instructions that, upon execution by the one or more computing devices, cause the one or more computing devices to at least:

form a checksum value for storage in the first storage location, the checksum value based at least in part on applying a checksum function to the first identifier and applying the checksum function to the second identifier.

17. The non-transitory computer-readable storage medium of claim 13, comprising further instructions that, upon execution by the one or more computing devices, cause the one or more computing devices to at least:

receive information corresponding to the first storage location, the information comprising a third value determined based at least in part on the first identifier, the second identifier, and a third identifier; and identify a third record corresponding to the third identifier based at least in part on the third value.

18. The non-transitory computer-readable storage medium of claim 17, comprising further instructions that, upon execution by the one or more computing devices, cause the one or more computing devices to at least:

send to a remote computing device a request to send transmit contents of the third record.

19. The non-transitory computer-readable storage medium of claim 13, comprising further instructions that, upon execution by the one or more computing devices, cause the one or more computing devices to at least:

store, in the first storage location, a checksum value computed based at least in part on a sum of cryptographic hash values of document identifiers, wherein the cryptographic hash values are computed with a cryptographic hash function that is different than the hash function; and determine the subset of information indicative of the first identifier that was not represented by the first value and the second value, based at least in part on the checksum value.

20. The non-transitory computer-readable storage medium of claim 13, wherein an output range of the hash function is equal to or greater than a square of the number of records in the plurality of records.

* * * * *